(12) United States Patent
Kariatsumari et al.

(10) Patent No.: US 8,855,858 B2
(45) Date of Patent: *Oct. 7, 2014

(54) MOTOR CONTROL UNIT AND VEHICLE STEERING SYSTEM

(75) Inventors: Yuji Kariatsumari, Yamatotakada (JP); Terutaka Tamaizumi, Okazaki (JP); Yoshinobu Shimizu, Sakai (JP)

(73) Assignee: Jtekt Corporation, Osaka-shi (JP)

( * ) Notice: Subject to any disclaimer, the term of this patent is extended or adjusted under 35 U.S.C. 154(b) by 72 days.

This patent is subject to a terminal disclaimer.

(21) Appl. No.: 12/945,101

(22) Filed: Nov. 12, 2010

(65) Prior Publication Data

US 2011/0112724 A1   May 12, 2011

(30) Foreign Application Priority Data

Nov. 12, 2009   (JP) ................................. 2009-258962

(51) Int. Cl.
*B62D 5/04* (2006.01)
*B62D 5/14* (2006.01)

(52) U.S. Cl.
CPC .............. *B62D 5/046* (2013.01); *B62D 5/0463* (2013.01); *Y10S 901/42* (2013.01)
USPC ............................................. 701/41; 901/42

(58) Field of Classification Search
CPC ..... B62D 5/046; B62D 5/0463; B62D 5/0472
USPC ............... 701/41–42; 180/412–423, 443–447
See application file for complete search history.

(56) References Cited

U.S. PATENT DOCUMENTS

| 5,513,720 | A | | 5/1996 | Yamamoto et al. |
|---|---|---|---|---|
| 5,568,389 | A | * | 10/1996 | McLaughlin et al. .......... 701/41 |
| 5,928,298 | A | | 7/1999 | Matsuoka et al. |
| 6,364,051 | B1 | | 4/2002 | Kada et al. |
| 6,396,229 | B1 | | 5/2002 | Sakamoto et al. |

(Continued)

FOREIGN PATENT DOCUMENTS

| EP | 1 487 098 A1 | 12/2004 |
|---|---|---|
| EP | 1 955 926 A2 | 8/2008 |

(Continued)

OTHER PUBLICATIONS

Nov. 28, 2013 Notice of Reasons for Rejection issued in Japanese Patent Application No. 2009-258962; with English-language translation.

(Continued)

*Primary Examiner* — Helal A Algahaim
*Assistant Examiner* — Charles J Han
(74) *Attorney, Agent, or Firm* — Oliff PLC

(57) ABSTRACT

A motor control unit includes a detected steering torque correction unit that corrects the detected steering torque that is detected by a torque sensor and then subjected to a limitation process by a steering torque limiter. When the absolute value of the detected steering torque is equal to or smaller than a predetermined value, the detected steering torque correction unit corrects the detected steering torque to 0. When the absolute value of the detected steering torque is larger than the predetermined value, the detected steering torque correction unit outputs the detected steering torque without correction. A PI control unit calculates the addition angle based on the deviation of the control torque obtained through correction by the detected steering torque correction unit from the command steering torque.

4 Claims, 7 Drawing Sheets

(56) References Cited

U.S. PATENT DOCUMENTS

| | | | |
|---|---|---|---|
| 6,397,969 B1 * | 6/2002 | Kasai et al. | 180/404 |
| 6,781,333 B2 | 8/2004 | Koide et al. | |
| 7,076,340 B1 | 7/2006 | Inazumi et al. | |
| 2002/0026270 A1 | 2/2002 | Kurishige et al. | |
| 2002/0180402 A1 * | 12/2002 | Koide et al. | 318/727 |
| 2003/0030404 A1 * | 2/2003 | Iwaji et al. | 318/700 |
| 2004/0267421 A1 | 12/2004 | Eskritt et al. | |
| 2005/0029972 A1 | 2/2005 | Imai et al. | |
| 2005/0257994 A1 | 11/2005 | Fujita | |
| 2005/0273236 A1 | 12/2005 | Mori et al. | |
| 2006/0086561 A1 | 4/2006 | Hidaka | |
| 2006/0090954 A1 | 5/2006 | Sugitani et al. | |
| 2006/0125439 A1 | 6/2006 | Ajima et al. | |
| 2007/0040528 A1 | 2/2007 | Tomigashi et al. | |
| 2007/0229021 A1 | 10/2007 | Yoshida et al. | |
| 2007/0273317 A1 | 11/2007 | Endo et al. | |
| 2007/0284181 A1 | 12/2007 | Muranaka | |
| 2008/0035411 A1 | 2/2008 | Yamashita et al. | |
| 2008/0047775 A1 | 2/2008 | Yamazaki | |
| 2008/0128197 A1 | 6/2008 | Kawaguchi et al. | |
| 2008/0201041 A1 * | 8/2008 | Jiang | 701/42 |
| 2009/0069979 A1 | 3/2009 | Yamashita et al. | |
| 2009/0240389 A1 | 9/2009 | Nomura et al. | |
| 2010/0057300 A1 | 3/2010 | Nishiyama | |
| 2010/0094505 A1 | 4/2010 | Kariatsumari et al. | |
| 2010/0198462 A1 | 8/2010 | Shinoda et al. | |
| 2010/0263709 A1 | 10/2010 | Norman et al. | |
| 2011/0035114 A1 | 2/2011 | Yoneda et al. | |
| 2012/0080259 A1 | 4/2012 | Ueda et al. | |

FOREIGN PATENT DOCUMENTS

| | | |
|---|---|---|
| EP | 2 086 106 A2 | 8/2009 |
| EP | 2 159 133 A1 | 3/2010 |
| EP | 2 177 422 A2 | 4/2010 |
| EP | 2 216 895 A2 | 8/2010 |
| JP | A 4-161085 | 6/1992 |
| JP | A 6-305436 | 11/1994 |
| JP | A 9-226606 | 9/1997 |
| JP | A 10-076960 | 3/1998 |
| JP | A-10-243699 | 9/1998 |
| JP | A 2000-050689 | 2/2000 |
| JP | A 2001-37281 | 2/2001 |
| JP | A 2001-251889 | 9/2001 |
| JP | A 2002-359996 | 12/2002 |
| JP | A 2003-125594 | 4/2003 |
| JP | A 2003-182620 | 7/2003 |
| JP | A 2007-53829 | 3/2007 |
| JP | A 2007-267549 | 10/2007 |
| JP | A 2008-24196 | 2/2008 |
| JP | A 2008-087756 | 4/2008 |
| JP | A 2009-124811 | 6/2009 |
| JP | A 2010-178549 | 8/2010 |
| WO | WO 2007/139030 A1 | 12/2007 |
| WO | WO 2009/138830 A1 | 11/2009 |

OTHER PUBLICATIONS

U.S. Appl. No. 12/823,573, filed Jun. 25, 2010.
U.S. Appl. No. 13/685,152, filed Nov. 26, 2012.
U.S. Appl. No. 12/696,604, filed Jan. 29, 2010.
U.S. Appl. No. 12/943,514, filed Nov. 10, 2010.
U.S. Appl. No. 12/946,187, filed Nov. 15, 2010.
U.S. Appl. No. 13/205,138, filed Aug. 8, 2011.
U.S. Appl. No. 12/997,168, filed Dec. 9, 2010.
Feb. 6, 2014 Office Action issued in U.S. Appl. No. 12/823,573.
Sep. 5, 2013 Office Action issued in U.S. Appl. No. 12/823,573.
Mar. 21, 2013 Office Action issued in U.S. Appl. No. 12/823,573.
Dec. 10, 2012 Office Action issued in U.S. Appl. No. 12/823,573.
Jun. 19, 2012 Office Action issued in U.S. Appl. No. 12/823,573.
Nov. 7, 2013 Office Action issued in U.S. Appl. No. 13/685,152.
Jul. 17, 2013 Office Action issued in U.S. Appl. No. 13/685,152.
Jul. 20, 2010 Search Report issued in European Patent Application No. 10156226.
May 24, 2012 Office Action issued in U.S. Appl. No. 12/721,855.
Feb. 6, 2014 Office Action issued in U.S. Appl. No. 12/696,604.
Jul. 15, 2013 Office Action issued in U.S. Appl. No. 12/696,604.
Mar. 25, 2013 Office Action issued in U.S. Appl. No. 12/696,604.
Nov. 29, 2012 Office Action issued in U.S. Appl. No. 12/696,604.
Jun. 12, 2012 Office Action issued in U.S. Appl. No. 12/696,604.
Aug. 31, 2012 Office Action issued in U.S. Appl. No. 12/943,514.
Mar. 22, 2013 Office Action issued in U.S. Appl. No. 12/943,514.
Sep. 10, 2013 Office Action issued in U.S. Appl. No. 12/943,514.
Feb. 10, 2014 Office Action issued in U.S. Appl. No. 12/943,514.
Feb. 6, 2014 Office Action issued in U.S. Appl. No. 12/946,187.
Sep. 10, 2013 Office Action issued in U.S. Appl. No. 12/946,187.
Jul. 15, 2013 Office Action issued in U.S. Appl. No. 12/946,187.
Sep. 19, 2012 Office Action issued in U.S. Appl. No. 12/946,187.
Feb. 11, 2014 Office Action issued in U.S. Appl. No. 13/205,138.
Sep. 5, 2013 Office Action issued in U.S. Appl. No. 13/205,138.
Mar. 20, 2013 Office Action issued in U.S. Appl. No. 13/205,138.
Sep. 19, 2012 Search Report issued in European Patent Application No. 11177780.1.
Sep. 10, 2012 Office Action issued in U.S. Appl. No. 13/205,138.
Feb. 6, 2014 Office Action issued in U.S. Appl. No. 12/997,168.
Sep. 10, 2013 Office Action issued in U.S. Appl. No. 12/997,168.
Mar. 25, 2013 Office Action issued in U.S. Appl. No. 12/997,168.
Aug. 14, 2012 Office Action issued in U.S. Appl. No. 12/997,168.
Feb. 8, 2011 International Preliminary Report on Patentability issued in International Patent Application No. PCT/JP2009/002991 (with translation).
Oct. 6, 2009 Search Report issued in International Patent Application No. PCT/JP2009/002991 (with translation).
May 22, 2014 Office Action issued in Japanese Patent Application No. 2010-186220 (with translation).

* cited by examiner

MOTOR CONTROL UNIT AND VEHICLE STEERING SYSTEM

INCORPORATION BY REFERENCE

The disclosure of Japanese Patent Application No. 2009-258962 filed on Nov. 12, 2009 including the specification, drawings and abstract is incorporated herein by reference in its entirety.

BACKGROUND OF THE INVENTION

1. Field of the Invention

The invention relates to a motor control unit used to drive a brushless motor, and a vehicle steering system, for example, an electric power steering system, which includes the motor control unit.

2. Description of the Related Art

A motor control unit that controls driving of a brushless motor is usually configured to control the electric current that is supplied to a motor based on the output from a rotational angle sensor that detects the rotational angle of a rotor. As a rotational angle sensor, a resolver that outputs a sine-wave signal and a cosine-wave signal that correspond to the rotational angle (electrical angle) of a rotor is usually used. However, a resolver is expensive, and needs a large number of wires and a large installation space. Therefore, using a resolver as a rotational angle sensor hinders reduction in cost and size of a unit that includes a brushless motor.

To address this problem, a sensorless drive method for driving a brushless motor without using a rotational angle sensor has been proposed. According to the sensorless drive method, the induced voltage that is caused due to the rotation of a rotor is estimated in order to estimate the phase of a magnetic pole (electrical angle of the rotor). When the rotor is at a standstill or rotating at a considerably low speed, it is not possible to estimate the phase of the magnetic pole. Therefore, the phase of the magnetic pole is estimated by another method. More specifically, a sensing signal is input in a stator, and a response of the motor to the sensing signal is detected. Then, the rotational position of the rotor is estimated based on the response of the motor.

For example, Japanese Patent Application Publication No. 10-243699 (JP-A-10-243699) describes the related art.

According to the sensorless drive method described above, the rotational position of the rotor is estimated based on the induced voltage or the sensing signal, and the motor is controlled based on the estimated rotational position. However, this drive method is not suitable for all uses. There has not been established a method suitable for a control of a brushless motor that is used as a drive source for, for example, a vehicle steering system such as an electric power steering system that supplies a steering assist force to a vehicle steering mechanism. Accordingly, a sensorless control executed by another method has been demanded.

SUMMARY OF INVENTION

The invention provides a motor control unit that controls a motor according to a new control method that does not require a rotational angle sensor, and a vehicle steering system that includes the motor control unit.

A first aspect of the invention relates to a motor control unit that controls a motor that includes a rotor and a stator that faces the rotor. The motor control unit includes a current drive unit, an addition angle calculation unit, a control angle calculation unit, a control torque calculation unit, and a command torque setting unit. The current drive unit drives the motor based on an axis current value of a rotating coordinate system that rotates in accordance with a control angle that is a rotational angle used in a control. The addition angle calculation unit calculates an addition angle that should be added to the control angle. The control angle calculation unit obtains a present value of the control angle by adding the addition angle calculated by the addition angle calculation unit to an immediately preceding value of the control angle in predetermined calculation cycles. The control torque calculation unit calculates a control torque based on a torque that is other than a motor torque and that is applied to a drive target that is driven by the motor. The command torque setting unit sets a command torque that is a torque that is other than the motor torque and that should be applied to the drive target. The addition angle calculation unit calculates the addition angle based on the deviation of the control torque calculated by the control torque calculation unit from the command torque set by the command torque setting unit.

BRIEF DESCRIPTION OF DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EXAMPLE EMBODIMENTS

Figure 1:
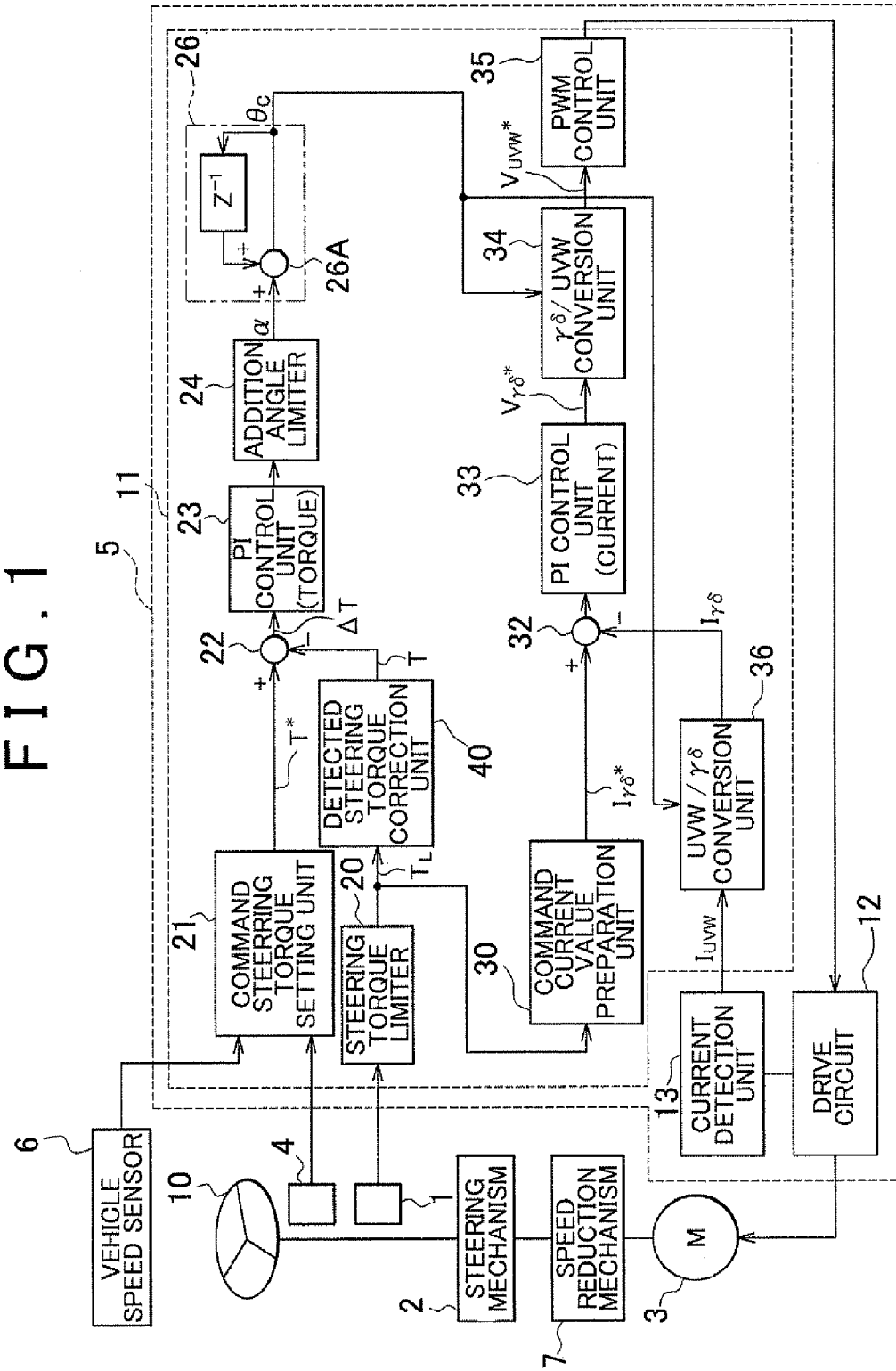
FIG. 1 is a block diagram for describing the electrical configuration of an electric power steering system to which a motor control unit according to an embodiment of the invention is applied.

Hereafter, example embodiments of the invention will be described in detail with reference to the accompanying drawings. FIG. 1 is a block diagram for describing the electrical configuration of an electric power steering system (an example of a vehicle steering system) to which a motor control unit according to an embodiment of the invention is applied. The electric power steering system includes a torque sensor 1, a motor 3 (brushless motor), a steering angle sensor 4, a motor control unit 5, and a vehicle speed sensor 6. The torque sensor 1 detects the steering torque T that is applied to a steering wheel 10 that serves as an operation member used to steer a vehicle. The motor 3 (brushless motor) applies a steering assist force to a steering mechanism 2 of the vehicle via a speed reduction mechanism 7. The steering angle sensor 4 detects the steering angle that is the rotational angle of the steering wheel 10. The motor control unit 5 controls driving of the motor 3. The vehicle speed sensor 6 detects the speed of the vehicle in which the electric power steering system is mounted. The steering angle sensor 4 detects the amount of rotation (rotational angle) of the steering wheel 10 from the neutral position (reference position) of the steering wheel 10 in the clockwise direction, and the amount of rotation of the steering wheel 10 from the neutral position in the counterclockwise direction. The steering angle sensor 4 outputs, as a positive value, the amount of rotation of the steering wheel 10 from the neutral position in the clockwise direction. The steering angle sensor outputs, as a negative value, the amount of rotation of the steering wheel 10 from the neutral position in the counterclockwise direction.

The motor control unit 5 drives the motor 3 based on the steering torque detected by the torque sensor 1, the steering angle detected by the steering angle sensor 4, and the vehicle speed detected by the vehicle speed sensor 6, thereby providing appropriate steering assistance based on the steering state and the vehicle speed.

Figure 2:
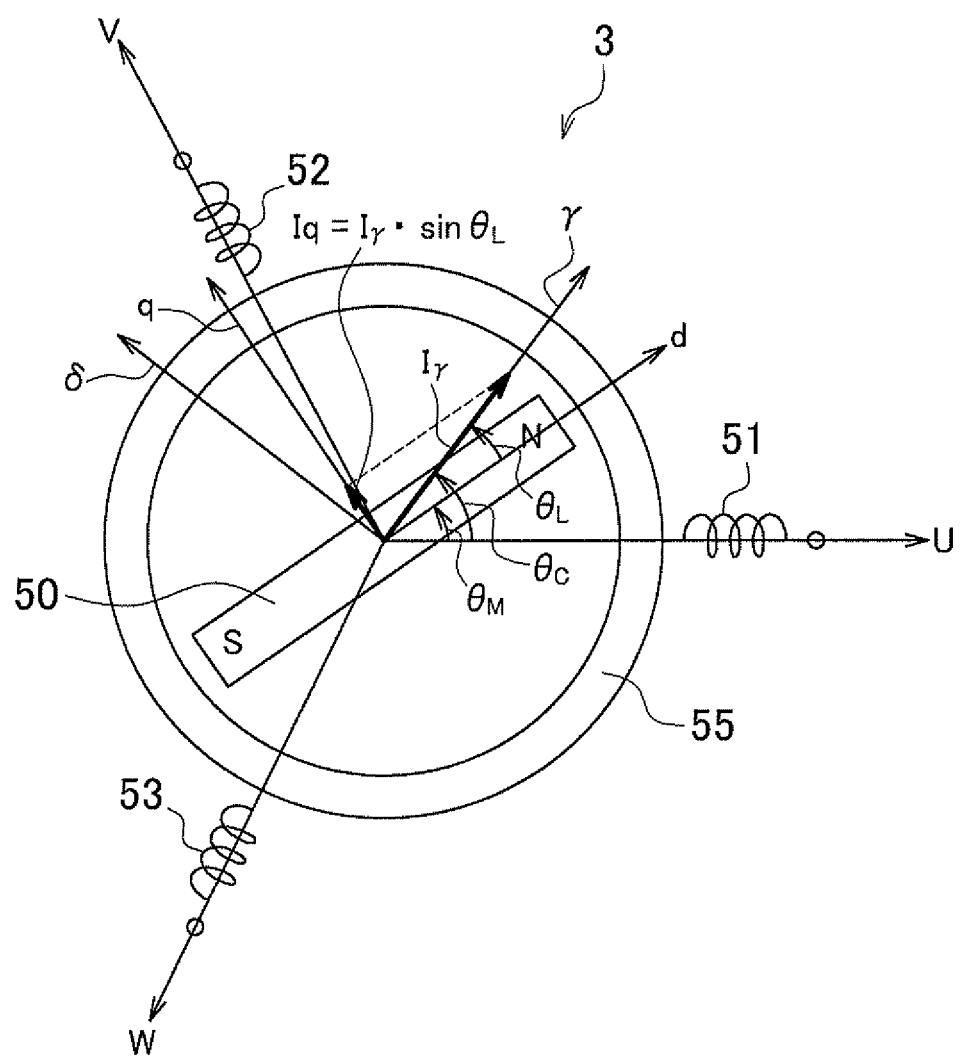
FIG. 2 is a view for describing the configuration of a motor.

In the embodiment, the motor 3 is a three-phase brushless motor. As illustrated in FIG. 2, the motor 3 includes a rotor 50 that serves as a field magnet, and a U-phase stator coil 51, a V-phase stator coil 52, and a W-phase stator coil 53 that are arranged on a stator 55 that faces the rotor 50. The motor 3 may be an inner rotor motor in which a stator is arranged on the outer side of a rotor so as to face the rotor, or an outer rotor motor in which a stator is arranged on the inner side of a tubular rotor so as to face the rotor.

A three-phase fixed coordinate system (UVW coordinate system), where the direction in which the U-phase stator coil 51 extends, the direction in which the V-phase coil 52 extends, and the direction in which the W-phase coil 53 extends are used as the U-axis, the V-axis and W-axis, respectively, is defined. In addition, a two-phase rotating coordinate system (dq coordinate system: actual rotating coordinate system), where the direction of the magnetic poles of the rotor 50 is used as the d-axis (axis of the magnetic poles) and the direction that is perpendicular to the d-axis within the rotary plane of the rotor 50 is used as the q-axis (torque axis), is defined. The dq coordinate system is a rotating coordinate system that rotates together with the rotor 50. In the dq coordinate system, only the q-axis current contributes to generation of torque by the rotor 50. Therefore, the d-axis current may be set to 0 and the q-axis current may be controlled based on a desired torque. The rotational angle (rotor angle) $\theta_M$ of the rotor 50 is a rotational angle of the d-axis with respect to the U-axis. The dq coordinate system is an actual rotating coordinate system that rotates in accordance with the rotor angle $\theta_M$. With the use of the rotor angle $\theta_M$, coordinate conversion may be made between the UVW coordinate system and the dq coordinate system.

In the embodiment, the control angle $\theta_C$ that indicates the rotational angle used in the control is employed. The control angle $\theta_C$ is an imaginary rotational angle with respect to the U-axis. An imaginary two-phase rotating coordinate system (γδ coordinate system: hereafter, referred to as "imaginary rotating coordinate system"), where the imaginary axis that forms the control angle $\theta_C$ with the U-axis is used as the γ-axis, and the axis that is advanced 90 degrees from the γ-axis is used as the δ-axis, is defined. When the control angle $\theta_C$ is equal to the rotor angle $\theta_M$, the γδ coordinate system, which is the imaginary rotating coordinate system, and the dq coordinate system, which is the actual rotating coordinate system, coincide with each other. That is, the γ-axis, which is the imaginary axis, coincides with the d-axis, which is the actual axis, and the δ-axis, which is the imaginary axis, coincides with the q-axis, which is the actual axis. The γδ coordinate system is an imaginary rotating coordinate system that rotates in accordance with the control angle $\theta_C$. Coordinate conversion may be made between the UVW coordinate system and the γδ coordinate system with the use of the control angle $\theta_C$.

The load angle $\theta_L$ ($=\theta_C-\theta_M$) is defined based on the difference between the control angle $\theta_C$ and the rotor angle $\theta_M$. When the γ-axis current $I_\gamma$ is supplied to the motor 3 based on the control angle $\theta_C$, the q-axis component of the γ-axis current $I_\gamma$ (orthogonal projection to the q-axis) is used as the q-axis current $I_q$ that contributes to generation of torque by the rotor 50. That is, the relationship expressed by Equation 1 is established between the γ-axis current $I_\gamma$ and the q-axis current $I_q$.

$$I_q = I_\gamma \times \sin\theta_L \qquad \text{Equation 1}$$

Referring again to FIG. 1, the motor control unit 5 includes a microcomputer 11, a drive circuit (inverter circuit) 12 that is controlled by the microcomputer 11 and that supplies electric power to the motor 3, and a current detection unit 13 that detects an electric current that flows through the stator coil of each phase of the motor 3.

The current detection unit 13 detects the U-phase current $I_U$, the V-phase current $I_V$ and the W-phase current $I_W$ that flow through the U-phase stator coil 51, the V-phase stator coil 52, and the W-phase stator coil 53 of the motor 3, respectively, (these phase currents will be collectively referred to as "three-phase detected current $I_{UVW}$" where appropriate). The U-phase current $I_U$, the V-phase current $I_V$ and the W-phase current $I_W$ are the current values in the directions of the axes of the UVW coordinate system. The microcomputer 11 includes a CPU and memories (a ROM, a RAM, etc.), and serves as multiple function processing units by executing predetermined programs. The multiple function processing units include a steering torque limiter 20, a command steering torque setting unit 21, a torque deviation calculation unit 22, a PI (proportional-integral) control unit 23, an addition angle limiter 24, a control angle calculation unit 26, a command current value preparation unit 30, a current deviation calculation unit 32, a PI control unit 33, a γδ/UVW conversion unit 34, a PWM (Pulse Width Modulation) control unit 35, a UVW/γδ conversion unit 36, and a detected steering torque correction unit 40.

Figure 4:
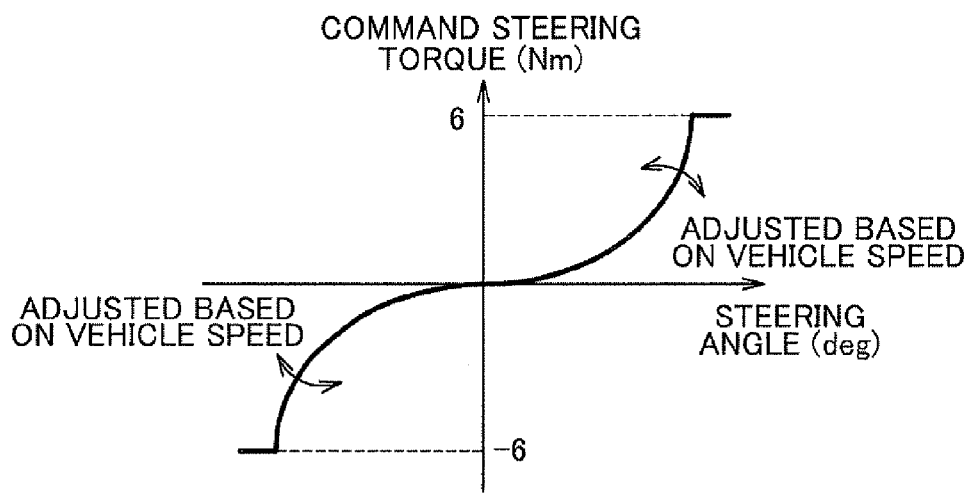
FIG. 4 is a graph showing an example of the characteristic of the command steering torque with respect to the steering angle.

The command steering torque setting unit 21 sets the command steering torque T* based on the steering angle detected by the steering angle sensor 4 and the vehicle speed detected by the vehicle speed sensor 6. For example, as shown in FIG. 4, the command steering torque T* when the steering angle is a positive value (when the steering wheel 10 is operated clockwise) is set to a positive value (torque applied in the clockwise direction), whereas the command steering torque T* when the steering angle is a negative value (when the steering wheel 10 is operated counterclockwise) is set to a negative value (torque applied in the counterclockwise direction). The command steering torque T* is set in such a manner that the absolute value of the command steering torque T* increases (non-linearly increases, in the example in FIG. 4) as the absolute value of the steering angle increases. However, the command steering torque T* is set to a value within a range between a predetermined upper limit (positive value (e.g. +6Nm)) and a predetermined lower limit (negative value (e.g. −6Nm)). In addition, the command steering torque T* is set in such a manner that the absolute value of the command steering torque T* decreases as the vehicle speed increases. That is, a vehicle speed-sensitive control is executed.

Figure 5:
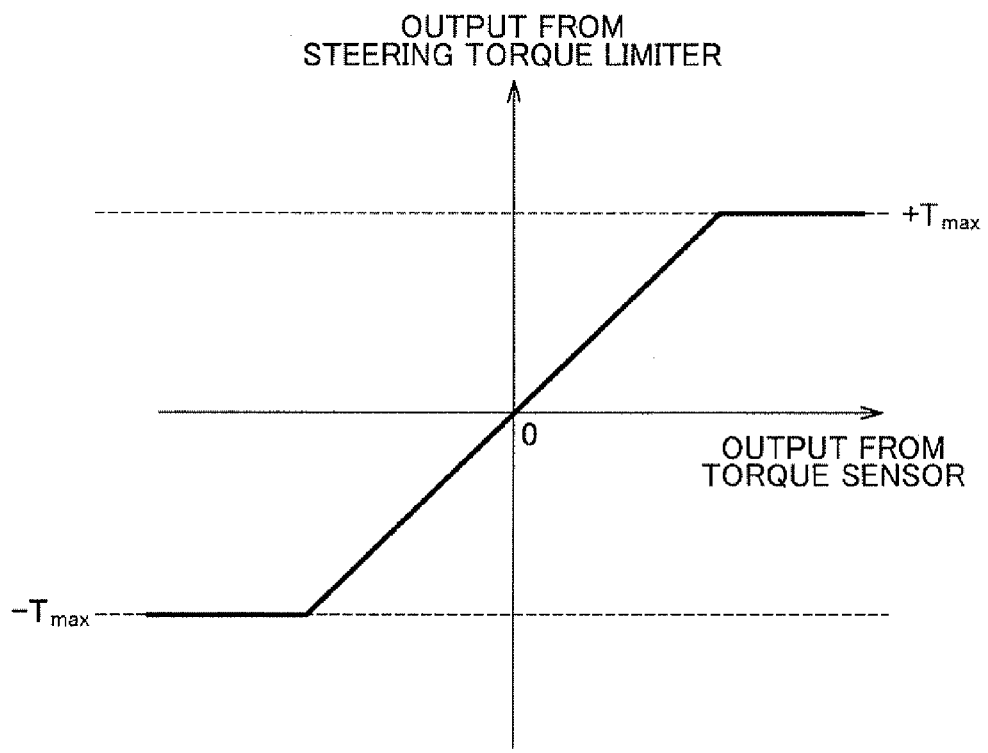
FIG. 5 is a graph for describing the function of a steering torque limiter.

The steering torque limiter 20 limits the output from the torque sensor 1 within a range between a predetermined upper saturation value +$T_{max}$ (+$T_{max}$>0 (e.g. +$T_{max}$=7 Nm)) and a predetermined lower saturation value −$T_{max}$ (−$T_{max}$<0 (e.g. −$T_{max}$=−7 Nm)). More specifically, as shown in FIG. 5, when the output from the torque sensor 1 is within the range between the upper saturation value +$T_{max}$ and the lower saturation value −$T_{max}$, the steering torque limiter 20 outputs the detected steering torque that is the value output from the torque sensor 1 without limitation. When the detected steering torque from the torque sensor 1 is equal to or higher than the upper saturation value +$T_{max}$, the steering torque limiter 20 outputs the upper saturation value +$T_{max}$. When the detected steering torque from the torque sensor 1 is equal to or lower than the lower saturation value −$T_{max}$, the steering torque limiter 20 outputs the lower saturation value −$T_{max}$. The saturation values +$T_{max}$ and −$T_{max}$ define a stable range (reliable range) of the output signal from the torque sensor 1. That is, in the range where the output from the torque sensor 1 is higher than the upper saturation value +$T_{max}$ and the range where the output from the torque sensor 1 is lower than the lower saturation value −$T_{max}$, the output signal from the torque sensor 1 is unstable and does not correspond to the actual steering torque. In other words, the saturation values +$T_{max}$ and −$T_{max}$ are determined based on the output characteristic of the torque sensor 1. Hereafter, the steering torque that is detected by the torque sensor 1 and then subjected to the limitation process by the steering torque limiter 20 will be referred to as "detected steering torque $T_L$".

Figure 6:
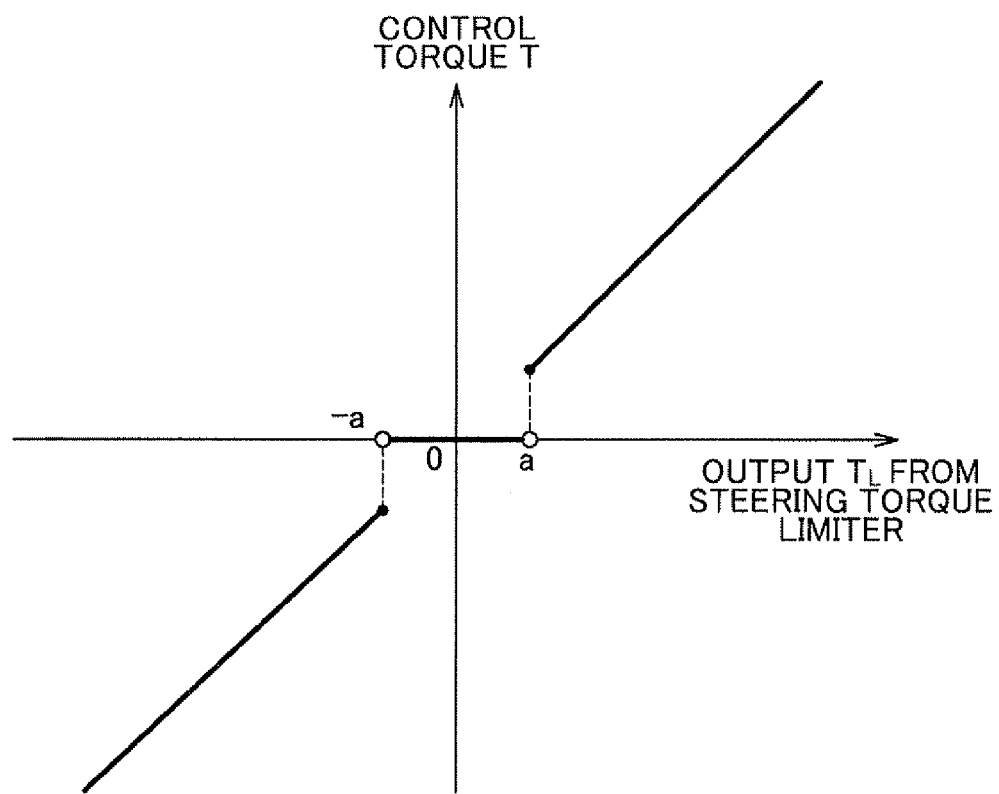
FIG. 6 is a graph for describing the function of a detected steering torque correction unit.

The detected steering torque correction unit 40 is a control torque calculation unit that calculates the control detected steering torque based on the detected steering torque $T_L$ obtained by the steering torque limiter 20. In other words, the detected steering torque correction unit 40 prepares the control detected steering torque (hereinafter, simply referred to as "control torque T") by correcting the detected steering torque $T_L$. More specifically, when the absolute value |$T_L$| of the detected steering torque $T_L$ is equal to or smaller than the predetermined value a (a>0) (|$T_L$|≤a), the detected steering torque correction unit 40 corrects the detected steering torque to 0, as shown in FIG. 6. On the other hand, when the absolute value |$T_L$| of the detected steering torque $T_L$ is larger than the predetermined value a (|$T_L$|>a), the detected steering torque correction unit 40 outputs the detected steering torque $T_L$ without correction. The predetermined value a is set to, for example, a value within a range from 0.3 Nm to 0.5 Nm. The control torque T after correction made by the detected steering torque correction unit 40 is expressed by Equation 2.

If |$T_L$|≤a, T=0

If |$T_L$|>a, T=$T_L$  Equation 2

The torque deviation calculation unit 22 obtains the deviation (torque deviation) ΔT (=T*−T) of the control torque T, which is detected by the torque sensor 1 and then subjected to the limitation process executed by the torque limiter 20 and the correction executed by the detected steering torque correction unit 40, from the command steering torque T* that is set by the command steering torque setting unit 21. The PI control unit 23 executes the PI calculation on the torque deviation ΔT. That is, the torque deviation calculation unit 22 and the PI control unit 23 constitute a torque feedback control unit that brings the control torque T to the command steering torque T*. The PI control unit 23 calculates the addition angle α for the control angle $θ_C$ by executing the PI calculation on the torque deviation ΔT. Therefore, the torque feedback control unit constitutes an addition angle calculation unit that calculates the addition angle α that should be added to the control angle $θ_C$.

The addition angle limiter 24 imposes limits on the addition angle α obtained by the PI control unit 23. More specifically, the addition angle limiter 24 limits the addition angle α to a value within a range between a predetermined upper limit UL (positive value) and a predetermined lower limit LL (negative value). The upper limit UL and the lower limit LL are determined based on a predetermined limit $ω_{max}$ ($ω_{max}$>0: e.g. preset value of $ω_{max}$=45 degrees). The preset value of the predetermined limit $ω_{max}$ is determined based on, for example, the maximum steering angular speed. The maximum steering angular speed is the maximum assumable value of the steering angular speed of the steering wheel 10, and, for example, approximately 800 deg/sec.

The rate of change in the electrical angle of the rotor 50 (angular speed in the electrical angle: maximum rotor angular speed) at the maximum steering angular speed is expressed by the product of the maximum steering angular speed, the speed reduction ratio of the speed reduction mechanism 7, and the number of pole pairs of the rotor 50, as indicated by Equation 3. The number of pole pairs is the number of magnetic pole pairs (pair of north pole and south pole) of the rotor 50.

Maximum rotor angular speed=maximum steering angular speed×speed reduction ratio×number of pole pairs  Equation 3

The maximum value of the amount of change in the electrical angle of the rotor 50 between the calculations (in the calculation cycle) of the control angle $θ_C$ is expressed by the value obtained by multiplying the maximum rotor angular speed by the calculation cycle, as indicated by Equation 4.

Maximum value of amount of change in rotor angle=maximum rotor angular speed×calculation cycle=maximum steering angular speed×speed reduction ratio×number of pole pairs×calculation cycle  Equation 4

This maximum value of the amount of change in the rotor angle is the maximum amount of change in the control angle $θ_C$ that is permitted within one calculation cycle. Therefore, the maximum value of the amount of change in the rotor angle may be used as the preset value of the limit $ω_{max}$. With the use of the limit $ω_{max}$, the upper limit UL and the lower limit LL for the addition angle α are expressed by Equation 5 and Equation 6, respectively.

UL=+$ω_{max}$  Equation 5

LL=−$ω_{max}$  Equation 6

The addition angle α obtained after the above-described limitation process executed by the addition angle limiter 24 is added to the immediately preceding value $θ_C$(n−1) (n is the number of the present calculation cycle) of the control angle $θ_C$ by an addition unit 26A of the control angle calculation unit 26 ("$Z^{-1}$" in the drawings indicates the immediately preceding value indicated by a signal). Note that, the initial value of the control angle $θ_C$ is a predetermined value (e.g. 0).

The control angle calculation unit 26 includes the addition unit 26A that adds the addition angle α provided from the addition angle limiter 24 to the immediately preceding value $θ_C$(n−1) of the control angle $θ_C$. That is, the control angle calculation unit 26 calculates the control angle $θ_C$ in predetermined calculation cycles. The control angle calculation unit 26 uses the control angle $θ_C$ in the immediately preceding calculation cycle as the immediately preceding value $θ_C$(n−1), and obtains the present value $θ_C$(n) that is the control angle $\theta_C$ in the present calculation cycle based on the immediately preceding value $\theta_C(n-1)$. The command current value preparation unit 30 prepares, as command current values, values of electric currents that should be supplied to the coordinate axes (imaginary axes) of the γδ coordinate system, which is the imaginary rotating coordinate system that corresponds to the control angle $\theta_C$ that is a rotational angle used in the control. More specifically, the command current value preparation unit 30 prepares the γ-axis command current value $I_\gamma^*$ and the δ-axis command current value $I_\delta^*$ (hereinafter, these values will be collectively referred to as "two-phase command current value $I_{\gamma\delta}^*$" where appropriate). The command current value preparation unit 30 sets the γ-axis command current value $I_\gamma^*$ to a significant value, and sets the δ-axis command current value $I_\delta^*$ to 0. More specifically, the command current value preparation unit 30 sets the γ-axis command current value $I_\gamma^*$ based on the detected steering torque $T_L$ that is detected by the torque sensor 1 and then subjected to the limitation process executed by the steering torque limiter 20.

Figure 7:
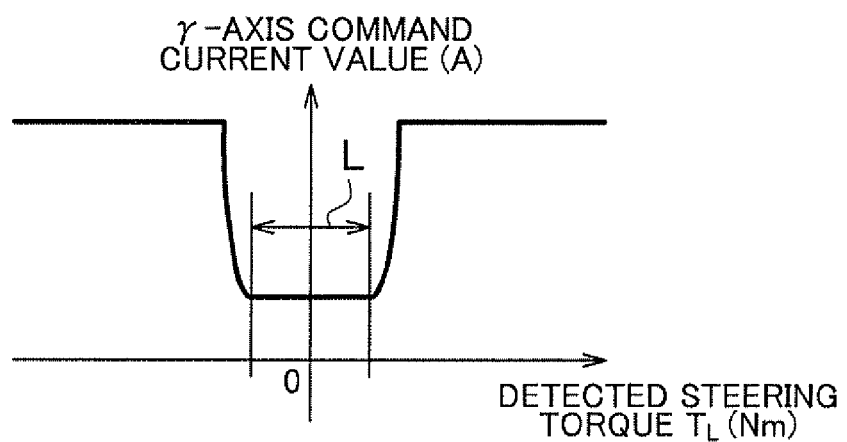
FIG. 7 is a graph showing an example of a manner of setting the q-axis command current value.

FIG. 7 shows an example of a manner of setting the γ-axis command current value $I_\gamma^*$ with respect to the detected steering torque $T_L$. The γ-axis command current value $I_\gamma^*$ is set to a low value within a range L where the detected steering torque $T_L$ is near 0. The γ-axis command current value $I_\gamma^*$ rises sharply in the region outside the range L where the detected steering torque $T_L$ is near 0, and is maintained substantially constant in the region where the torque is at or higher than a predetermined value. Thus, when the driver does not operate the steering wheel 10, the γ-axis command current value $I_\gamma^*$ is reduced to suppress unnecessary electric power consumption.

The current deviation calculation unit 32 calculates the deviation $I_\gamma^* - I_\gamma$ of the γ-axis detected current $I_\gamma$ from the γ-axis command current value $I_\gamma^*$ prepared by the command current value preparation unit 30, and the deviation $I_\delta^* - I_\delta$ of the δ-axis detected current $I_\delta$ from the δ-axis command current value $I_\delta^*(=0)$. The γ-axis detected current $I_\gamma$ and the δ-axis detected current $I_\delta$ are provided from the UVW/γδ conversion unit 36 to the deviation calculation unit 32.

The UVW/γδ conversion unit 36 converts the three-phase detected current $I_{UVW}$ (U-phase detected current $I_U$, V-phase detected current $I_V$, and the W-phase detected current $I_W$) of the UVW coordinate system, which is detected by the current detection unit 13, into the two-phase detected currents $I_\gamma$ and $I_\delta$ of the γδ coordinate system (hereinafter, these phase currents will be collectively referred to as "two-phase detected current $I_{\gamma\delta}$" where appropriate). These two-phase detected currents $I_\gamma$ and $I_\delta$ are provided to the current deviation calculation unit 32. The control angle $\theta_C$ calculated by the control angle calculation unit 26 is used for the coordinate conversion that is executed by the UVW/γδ conversion unit 36.

The PI control unit 33 executes the PI calculation on the current deviation calculated by the current deviation calculation unit 32 to prepare the two-phase command voltage $V_{\gamma\delta}^*$ (the γ-axis command voltage $V_\gamma^*$ and the δ-axis command voltage $V_\delta^*$) that should be applied to the motor 3. The two-phase command voltage $V_{\gamma\delta}^*$ is provided to the γδ/UVW conversion unit 34. The γδ/UVW conversion unit 34 executes the coordinate conversion calculation on the two-phase command voltage $V_{\gamma\delta}^*$ to prepare the three-phase command voltage $V_{UVW}^*$. The three-phase command voltage $V_{UVW}^*$ is formed of the U-phase command voltage $V_U^*$, the V-phase command voltage $V_V^*$ and the W-phase command voltage $V_W^*$. The three-phase command voltage $V_{UVW}^*$ is provided to the PWM control unit 35.

The PWM control unit 35 prepares the U-phase PWM control signal, the V-phase PWM control signal and the W-phase PWM control signal having duty ratios that correspond to the U-phase command voltage $V_U^*$, the V-phase command voltage $V_V^*$ and the W-phase command voltage $V_W^*$, respectively, and provides the control signals to the drive circuit 12. The drive circuit 12 is formed of an inverter circuit having three phases that correspond to the U-phase, the V-phase and the W-phase. The power elements that constitute the inverter circuit are controlled based on the PWM control signals provided from the PWM control unit 35, and therefore the voltages that correspond to the three-phase command voltage $V_{UVW}^*$ are applied to the U-phase stator coil 51, the V-phase stator coil 52 and the W-phase stator coil 53 of the motor 3.

Figure 3:
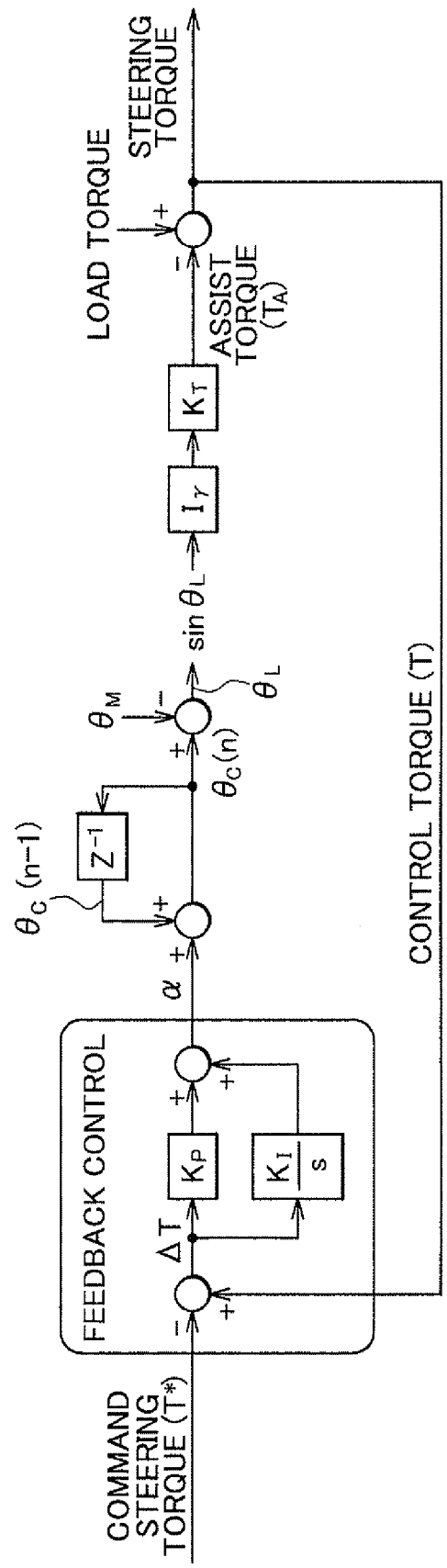
FIG. 3 is a control block diagram for the electric power steering system.

The current deviation calculation unit 32 and the PI control unit 33 constitute a current feedback control unit. The current feedback control unit controls the electric current that is supplied to the motor 3 in such a manner that the electric current that is supplied to the motor 3 approaches the two-phase command current value $I_{\gamma\delta}^*$ that is set by the command current value preparation unit 30. FIG. 3 is a control block diagram of the electric power steering system. Note that the function of the addition angle limiter 24 is omitted to simplify the explanation.

Through the PI control ($K_P$ is a proportionality coefficient, $K_I$ is an integration coefficient, and 1/s is an integration operator) on the deviation (torque deviation) ΔT of the control torque T from the command steering torque T*, the addition angle α is prepared. The present value $\theta_C(n)$ ($\theta_C(n)=\theta_C(n-1)+\alpha$) of the control angle θc is obtained by adding the addition angle α to the immediately preceding value $\theta_C(n-1)$ of the control angle $\theta_C$. At this time, the deviation of the actual rotor angle $\theta_M$ of the rotor 50 from the control angle $\theta_C$ is used as the load angle $\theta_L$ ($\theta_L=\theta_C-\theta_M$).

Therefore, if the γ-axis current $I_\gamma$ is supplied to the γ-axis (imaginary axis) in the γδ coordinate system (imaginary rotating coordinate system), which rotates in accordance with the control angle $\theta_C$, based on the γ-axis command current value $I_\gamma^*$, the q-axis current $I_q$ is equal to $I_\gamma \sin \theta_L$ ($I_q = I_\gamma \sin \theta_L$). The q-axis current $I_q$ contributes to generation of torque by the rotor 50. That is, the value obtained by multiplying the q-axis current $I_q$ ($=I_\gamma \sin \theta_L$) by the torque constant $K_T$ of the motor 3 is transmitted to the steering mechanism 2 via the speed reduction mechanism 7 as the assist torque $T_A$ ($=K_T \times I_\gamma \sin \theta_L$). The value obtained by subtracting the assist torque $T_A$ from a load torque from the steering mechanism 2 is the steering torque that should be applied by the driver to the steering wheel 10. When the steering torque is fed back through the steering torque limiter 20 and the detected steering torque correction unit 40, a system is operated in such a manner that the steering torque is brought to the command steering torque T*. That is, the addition angle α is obtained and the control angle $\theta_C$ is controlled based on the addition angle α so that the control torque T coincides with the command steering torque T*.

The control angle $\theta_C$ is updated with the use of the addition angle α that is obtained based on the deviation ΔT of the control torque T from the command steering torque T* while an electric current is supplied to the γ-axis that is the imaginary axis used in the control. Thus, the load angle $\theta_L$ changes and therefore, the torque that corresponds to the load angle $\theta_L$ is generated by the motor 3. Therefore, the torque that corresponds to the command steering torque T* set based on the steering angle and the vehicle speed is generated by the motor 3. Accordingly, an appropriate steering assist force that corresponds to the steering angle and the vehicle speed is applied to the steering mechanism 2. That is, a steering assist control is executed in such a manner that the steering torque increases as the absolute value of the steering angle increases and the steering torque decreases as the vehicle speed increases.

Figure 8:
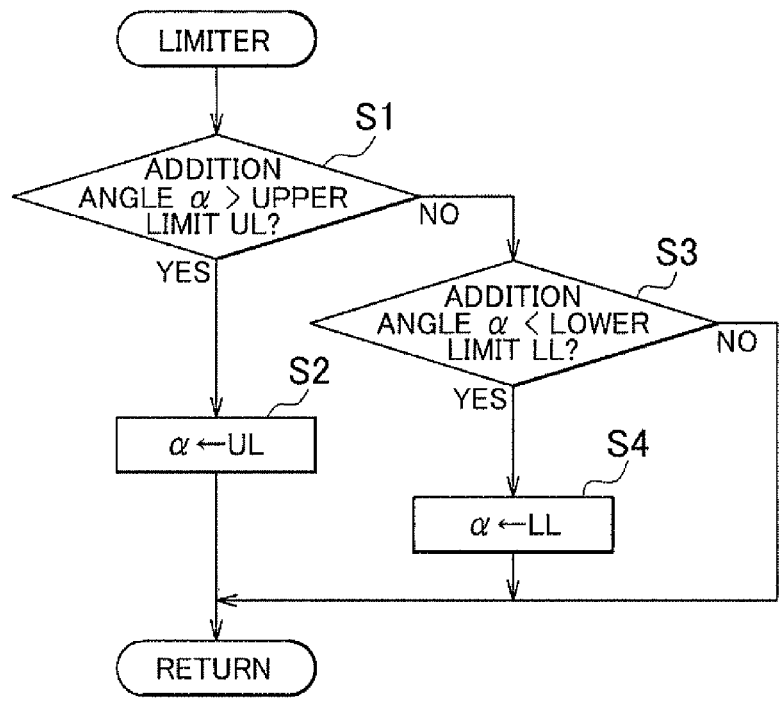
FIG. 8 is a flowchart for describing the function of an addition angle limiter.

Therefore, there is provided the electric power steering system in which an appropriate steering assist operation is executed by appropriately controlling the motor 3 without using a rotational angle sensor. Thus, the configuration is simplified and cost is reduced. FIG. 8 is a flowchart for describing the function of the addition angle limiter 24. The addition angle limiter 24 compares the addition angle α obtained by the PI control unit 23 with the upper limit UL (step (hereinafter, referred to as "S") 1). When the addition angle α is larger than the upper limit UL ("YES" in S1), the upper limit UL is substituted for the addition angle α (S2). Thus, the upper limit UL ($=+\omega_{max}$) is added to the control angle $\theta_C$.

When the addition angle α obtained by the PI control unit 23 is equal to or smaller than the upper limit UL ("NO" in S1), the addition angle limiter 24 further compares the addition angle α with the lower limit LL (S3). When the addition angle α is smaller than the lower limit LL ("YES" in S3), the lower limit LL is substituted for the addition angle α (S4). Thus, the lower limit LL ($=-\omega_{max}$) is added to the control angle $\theta_C$.

When the addition angle α obtained by the PI control unit 23 is equal to or larger than the lower limit LL and equal to or smaller than the upper limit UL ("NO" in S3), the addition angle α is added to the control angle $\theta_C$ without limitation. Therefore, the addition angle limiter 24 limits the addition angle α to a value within the range between the upper limit UL and the lower limit LL so as to stabilize the control. More specifically, although the control state is unstable (assist force is unstable) when the electric current is low or when the control starts, the control is encouraged to move to the stable state.

In the embodiment described above, the detected steering torque correction unit 40 is provided. When the absolute value $|T_L|$ of the detected steering torque $T_L$ is equal to or smaller than the predetermined value a ($|T_L| \le a$), the detected steering torque correction unit 40 corrects the detected steering torque to 0. On the other hand, when the absolute value $|T_L|$ of the detected steering torque $T_L$ is larger than the predetermined value a ($|T_L| > a$), the detected steering torque correction unit 40 outputs the detected steering torque $T_L$ without correction. If the detected steering torque correction unit 40 is not provided, the following problem may occur. When the steering wheel 10 is in the neutral position, the detected steering angle detected by the steering angle sensor 4 becomes 0. Therefore, the command steering torque T* set by the command steering torque setting unit 21 becomes 0 Nm as shown in FIG. 4. In the case where the driver takes his/her hands off the steering wheel 10 when the steering wheel 10 is in a position near the neutral position, if the steering torque detected by the torque sensor 1 has an error, the steering torque detected by the torque sensor 1 does not become 0 Nm. Accordingly, the torque deviation ΔT calculated by the torque deviation calculation unit 22 does not become 0. Therefore, the control angle $\theta_C$ changes. Then, the torque (assist torque) of the motor 3 changes, and therefore a steering force is supplied to the steering mechanism 2.

That is, when the detected steering torque correction unit 40 is not provided, if the driver takes his/her hands off the steering wheel 10 when the steering wheel 10 is in a position near the neutral position, self-steering may be performed, that is, the steered wheels may be steered by the steering mechanism 2. In the embodiment described above, when the driver takes his/her hands off the steering wheel 10 when the steering wheel 10 is in a position near the neutral position, even if the detected steering torque detected by the torque sensor 1 does not become 0 Nm, the detected steering torque detected by the torque sensor 1 is corrected to 0 Nm by the detected steering torque correction unit 40. Thus, the torque deviation ΔT calculated by the torque deviation calculation unit 22 becomes 0, and therefore, the control angle $\theta_C$ does not change. According to the embodiment described above, it is possible to prevent occurrence of self-steering when the driver takes his/her hands off the steering wheel 10 when the steering wheel 10 is in a position near the neutral position.

Figure 9:
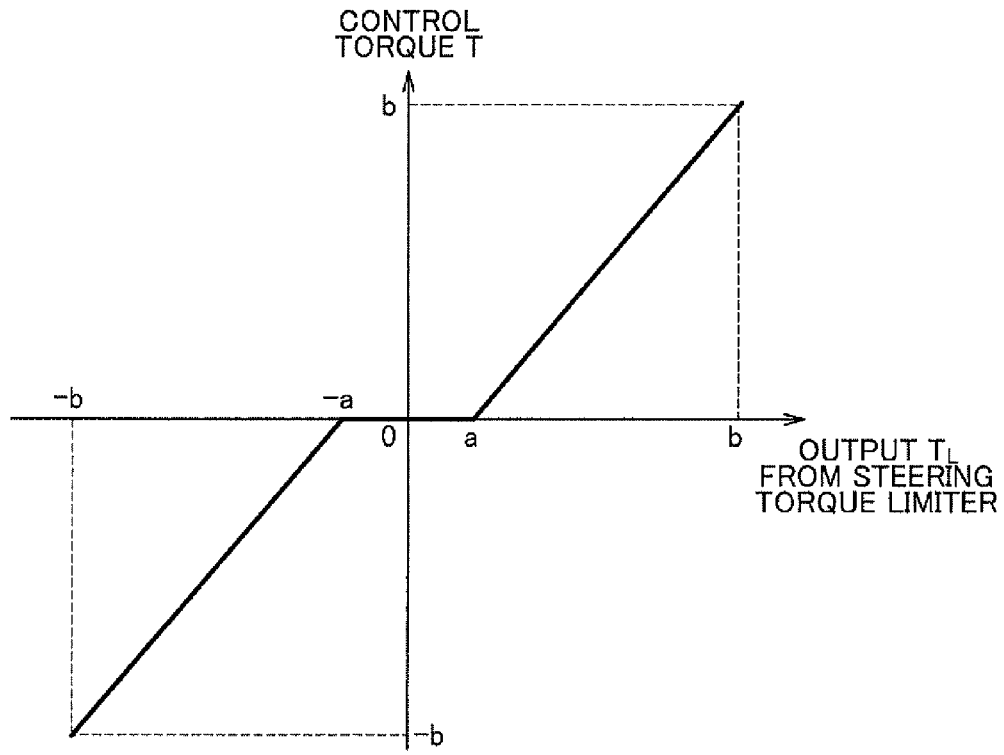
FIG. 9 is a graph for describing the function of a detected steering torque correction unit according to another embodiment.

With the detected steering torque correction unit 40, when the detected steering torque $T_L$ output from the torque limiter 20 changes so as to exceed the predetermined value a or changes so as to fall below the predetermined value −a, the control torque T output from the detected steering torque correction unit 40 changes sharply, as shown in FIG. 6. Then, the steering torque also changes sharply, which may deteriorate the steering feel. Therefore, a unit that has the input-output characteristics as shown in FIG. 9 may be used as the detected steering torque correction unit 40. More specifically, when the absolute value $|T_L|$ of the detected steering torque $T_L$ is equal to or smaller than the first predetermined value a (a>0) ($|T_L| \le a$), the detected steering torque correction unit 40 corrects the detected steering torque $T_L$ to 0. When the detected steering torque $T_L$ is higher than the first predetermined value a and lower than the second predetermined value b that is higher than the first predetermined value a (b>a) (a<$T_L$<b), the detected steering torque correction unit 40 corrects the detected steering torque $T_L$ in such a manner that the output value T smoothly increases (linearly changes in an example in FIG. 9) from a value near 0 as the detected steering torque $T_L$ becomes higher than the predetermined value a by a larger amount. When the detected steering torque $T_L$ is equal to or higher than the second predetermined value b, the detected steering torque correction unit 40 outputs the detected steering torque $T_L$ without correction.

When the detected steering torque $T_L$ is lower than the predetermined value −a and higher than the predetermined value −b (−b<$T_L$<−a), the detected steering torque correction unit 40 corrects the detected steering torque $T_L$ in such a manner that the output value T smoothly decreases from a value near 0 (linearly changes in the example in FIG. 9) as the detected steering torque $T_L$ becomes lower than the predetermined value −a by a larger amount. When the detected steering torque $T_L$ is equal to or lower than the predetermined value −b, the detected steering torque correction unit 40 outputs the detected steering torque $T_L$ without correction.

The first predetermined value a is set to, for example, a value within a range from 0.3 Nm to 0.5 Nm. The second predetermined value b is set to, for example, a value that is equal to or lower than the maximum torque that can be detected by the torque sensor 1 (the maximum torque immediately before the output from the torque sensor 1 is saturated). More specifically, the second predetermined value b is set to a value equal to or lower than the above-described upper limit saturation value $+T_{max}$ (see FIG. 5).

That is, the detected steering torque correction unit 40 calculates the control torque T based on Equations 7-1 to 7-5. Note that, when the second predetermined value b is set to a value equal to the upper limited saturation value, correction based on Equations 7-3 to 7-5 is not required.

If $-a \le T_L \le a$, then $T=0$   Equation 7-1

If $a<T_L<b$, then $T=\{b/(b-a)\} \times T_L - \{ab/(b-a)\}$   Equation 7-2

If $T_L \ge b$, then $T=T_L$   Equation 7-3

If $-b<T_L<-a$, then $T=\{b/(b-a)\} \times T_L + \{ab/(b-a)\}$   Equation 7-4

If $T_L \le -b$, then $T=T_L$   Equation 7-5

Figure 10:
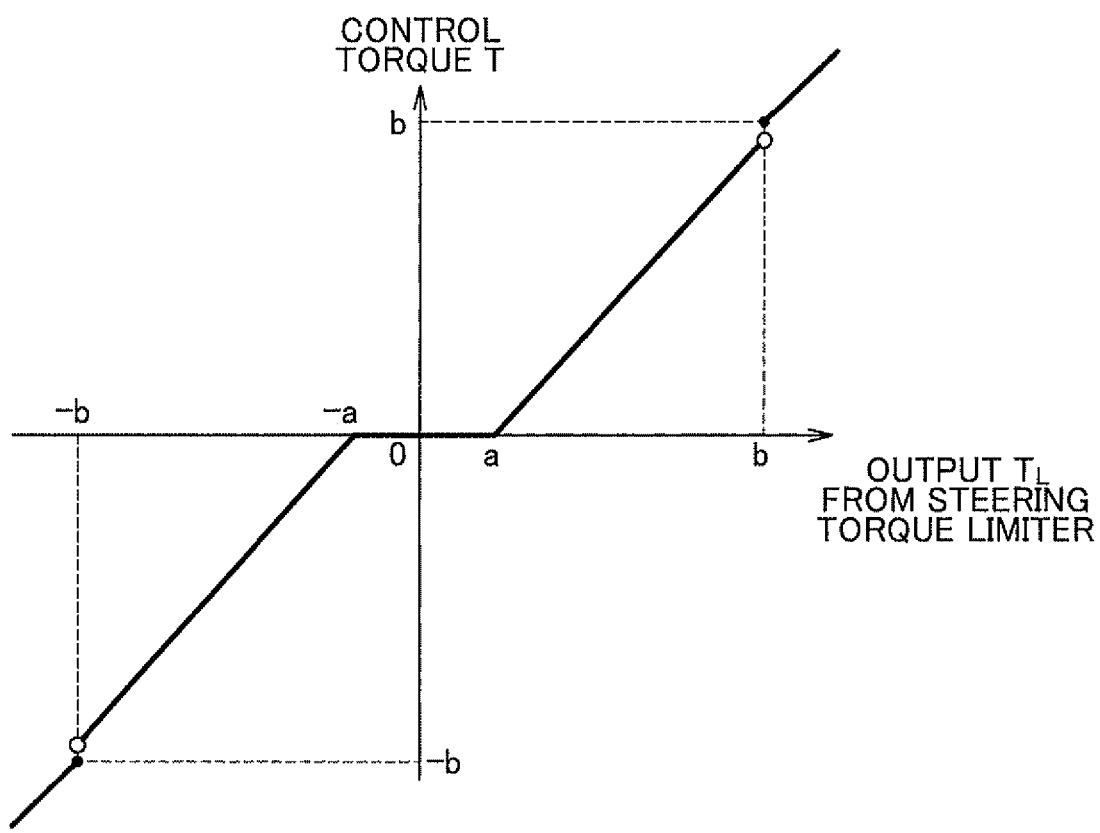
FIG. 10 is a graph for describing the function of a detected steering torque correction unit according to another embodiment.

More specifically, a map that corresponds to the input-output characteristics as shown in FIG. 9 is prepared in advance according to Equations 7-1 to 7-5. The detected steering torque correction unit 40 corrects the detected steering torque based on the map. If the detected steering torque correction unit 40 is used, even if the detected steering torque $T_L$ output from the torque limiter 20 changes so as to exceed the predetermined value a or changes so as to fall below the predetermined value −a, the control torque T calculated by the detected steering torque correction unit 40 smoothly changes. Therefore, the steering feel improves. In the example in FIG. 9, the map is formed of functions that are continuous with each other at each point at which the absolute value of the detected steering torque $T_L$ is equal to the second predetermined value b. Alternatively, as shown in FIG. 10, the map may be formed of functions that are not continuous with each other at each point at which the absolute value of the detected steering torque $T_L$ is equal to the second predetermined value b.

In the example in FIG. 9, when the detected steering torque $T_L$ is higher than the first predetermined value a and lower than the second predetermined value b ($a<T_L<b$) or when the detected steering torque $T_L$ is lower than the predetermined value −a and higher than the predetermined value −b ($-b<T_L<-a$), the input-output characteristics of the detected steering torque correction unit 40 changes in such a manner that the absolute value of the control torque T smoothly and linearly increases from a value near 0 as the absolute value of the detected steering torque $T_L$ increases. Alternatively, the input-output characteristics of the detected steering torque correction unit 40 may change in such a manner that the absolute value of the control torque T smoothly and non-linearly increases from a value near 0 as the absolute value of the detected steering torque $T_L$ increases.

While the embodiment of the invention has been described, the invention is not limited to the above-described embodiment and may be implemented in various other embodiments. For example, in the embodiment described above, the addition angle α is obtained by the PI control unit 23. The addition angle α may be obtained by a PID (proportional-integral-differential) calculation unit instead of the PI control unit 23. In the embodiment described above, a rotational angle sensor is not provided and the motor 3 is driven by executing the sensorless control. Alternatively, a rotational angle sensor, for example, a resolver may be provided and the above-described sensorless control may be executed when the rotational angle sensor malfunctions. Thus, even if the rotational angle sensor malfunctions, driving of the motor 3 is continued. Therefore, the steering assist operation is continued.

In this case, when the rotational angle sensor is used, the δ-axis command current value $I_δ^*$ may be prepared by the command current value preparation unit 30 based on the steering torque and the vehicle speed and according to the predetermined assist characteristics. In the embodiment described above, the invention is applied to the electric power steering system. Alternatively, the invention may be applied to a motor control for an electric pump hydraulic power steering system. Further alternatively, the invention may be implemented in various embodiments other than a control of a motor for an electric pump hydraulic power steering system and a power steering system. For example, the invention may be applied to a steer-by-wire (SBW) system, a variable gear ratio (VGR) steering system, and a control of a brushless motor provided in another type of vehicle steering system. The motor control unit according to the invention may be used in not only a control for the vehicle steering system but also controls for motors for other use.

In addition, various design changes may be made within the scope of claims.

What is claimed is:

1. A motor control unit that controls a motor that includes a rotor and a stator that faces the rotor, comprising:
at least one processor;
at least one non transitory computer-readable storage medium, the at least one non transitory computer-readable storage medium storing instructions that when executed cause the at least one processor to perform as:
a current drive unit that drives the motor based on an axis current value of a rotating coordinate system that rotates in accordance with a control angle that is a rotational angle used in a control and calculated without using a rotational angle sensor that detects a rotation angle of the rotor so that the control angle is determined independently from the rotation angle of the rotor;
an addition angle calculation unit that calculates, without detecting a change of the rotation angle of the rotor, an addition angle that is to be added to the control angle;
a control angle calculation unit that obtains a present value of the control angle by adding the addition angle calculated by the addition angle calculation unit to an immediately preceding value of the control angle in predetermined calculation cycles;
a control torque calculation unit that calculates a control torque based on a torque that is other than a motor torque and that is applied to a drive target that is driven by the motor; and
a command torque setting unit that sets a command torque that is a torque that is other than the motor torque and that is to be applied to the drive target,
wherein the addition angle calculation unit calculates the addition angle based on a deviation of the control torque calculated by the control torque calculation unit from the command torque set by the command torque setting unit,
wherein when an absolute value of a torque other than the motor torque is equal to or smaller than a first predetermined value, the control torque calculation unit sets the control torque to 0,
wherein in a case where a torque other than the motor torque, which is input in the control torque calculation unit, is expressed by $T_L$, the first predetermined value is expressed by X, and a second predetermined value that is larger than the first predetermined value is expressed by Y, the control torque calculation unit calculates the control torque such that, when $X<T_L<Y$ or $-Y<T_L<-X$, an absolute value of the control torque linearly and smoothly increases from a value near 0 as the absolute value of the torque other than the motor torque increases, and
wherein when $X<T_L<Y$, the control torque calculation unit calculates the control torque according to an equation, $T=\{Y/(Y-X)\}\times T_L-\{XY/(Y-X)\}$, and when $-Y<T_L<-X$, the control torque calculation unit calculates the control torque according to an equation, $T=\{Y/(Y-X)\}\times T_L+\{XY/(Y-X)\}$.

2. The motor control unit according to claim 1, wherein when $T_L \geq Y$ or $T_L \leq -Y$, the control torque calculation unit sets the control torque to the torque other than the motor torque.

3. The motor control unit according to claim 1, wherein in a case where the torque other than the motor torque, which is input in the control torque calculation unit, is expressed by $T_L$, the first predetermined value is expressed by X, and a second predetermined value that is larger than the first predetermined value is expressed by Y, the control torque calculation unit calculates the control torque such that, when $X<T_L<Y$ or $-Y<T_L<-X$, an absolute value of the control torque non-linearly and smoothly increases from a value near 0 as the absolute value of the torque other than the motor torque increases.

4. A vehicle steering unit, comprising:
   a motor that supplies a driving force to a steering mechanism of a vehicle; and
   the motor control unit according to claim 1 that is connected to the motor via one or more electrical connections.

* * * * *